(No Model.)
F. C. KLINDER.
SIDEWALK OR BUILDING BLOCK.
No. 496,201. Patented Apr. 25, 1893.
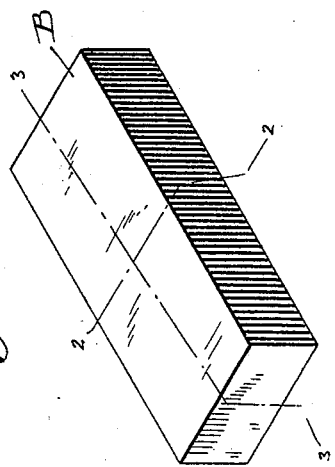
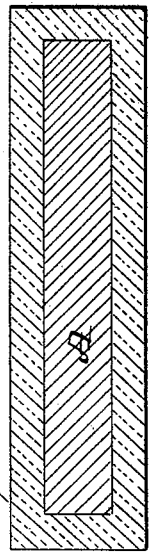
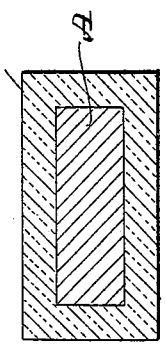
Witnesses
Geo. W. Avery
C. H. Scott
Inventor
Frank C. Klinder
By H. G. Underwood
Attorneys

United States Patent Office.

FRANK C. KLINDER, OF SHEBOYGAN, WISCONSIN.

SIDEWALK OR BUILDING BLOCK.

SPECIFICATION forming part of Letters Patent No. 496,201, dated April 25, 1893.

Application filed May 11, 1892. Serial No. 432,634. (No model.)

*To all whom it may concern:*

Be it known that I, FRANK C. KLINDER, a citizen of the United States, and a resident of Sheboygan, in the county of Sheboygan, and in the State of Wisconsin, have invented certain new and useful Improvements in Sidewalk or Building Blocks or Bricks; and I do hereby declare that the following is a full, clear, and exact description thereof.

My invention relates to sidewalk or building blocks or bricks and consists in certain peculiarities of construction, all as will be fully set forth hereinafter, and subsequently claimed.

In the drawings, Figure 1 is a perspective view of one of my improved blocks or bricks. Fig. 2 is a transverse vertical section thereof on the line 2—2 of Fig. 1, and Fig. 3 is a longitudinal section thereof, on the line 3—3 of Fig. 1.

A represents the center of my improved block, said center being composed of a hard burned brick. This center is completely surrounded on the top, bottom, sides and ends by a veneer, marked B, composed preferably of a mixture of Portland cement and sharp clean sand forming an artificial stone.

In carrying my invention into effect I proceed as follows: The hard brick for the interior is made in the ordinary manner, and dried and burned in a brick-kiln. The veneer is composed of a mixture of one part, by measure, of Portland cement, one part of clean sharp sand, and one part of water; this, when thoroughly mixed together, makes a thin paste. I next take a form, or mold, which is just the size that the completed brick is to be, and in this I first pour the described paste to the required depth (say half an inch) and then on this I place the brick-center A which will leave a space all around the same between this part A and the end and side walls of the form or mold, equal to the desired thickness of the veneer, there being an equal distance, also, from the top of the part A to the line of the top of said form or mold, and all of this space is then filled with the described paste, even with the top of the said mold. I permit the mold and contents to stand one day and then the mold is removed, and all the surfaces of the compound brick smoothed and polished, and then the article is put in an air-tight room with a temperature of from 50° to 75°, Fahrenheit, and allowed to remain there five weeks, when it will be ready for use, and so hard and solid that it will not readily chip or crack even under the blows of a hammer.

My improved blocks are especially useful for sidewalks and analogous purposes, and may be of any size or proportions desired. They are also useful for building purposes, and in fact, wherever ordinary brick, or stone, might be employed.

Having thus described my invention, what I claim, and desire to secure by Letters Patent, is—

As an article of manufacture, a sidewalk or building block, consisting of a center of hard-burned brick, and a veneer of artificial stone.

In testimony that I claim the foregoing I have hereunto set my hand, at Sheboygan, in the county of Sheboygan and State of Wisconsin, in the presence of two witnesses.

FRANK C. KLINDER.

Witnesses:
BARNHARD C. KLINDER,
WILHELM BARSCHAZ.